(12) United States Patent
Krimon et al.

(10) Patent No.: US 11,506,482 B2
(45) Date of Patent: *Nov. 22, 2022

(54) DETERMINING DEVICE CURVATURE IN SMART BENDABLE SYSTEMS

(71) Applicant: Intel Corporation, Santa Clara, CA (US)

(72) Inventors: Yuri I. Krimon, Folsom, CA (US); David I. Poisner, Carmichael, CA (US); Reinhard R. Steffens, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,114

(22) Filed: Feb. 15, 2021

(65) Prior Publication Data

US 2021/0164775 A1 Jun. 3, 2021

Related U.S. Application Data

(63) Continuation of application No. 16/532,392, filed on Aug. 5, 2019, now Pat. No. 10,921,116, which is a
(Continued)

(51) Int. Cl.
*G08B 21/00* (2006.01)
*G01B 11/16* (2006.01)
(Continued)

(52) U.S. Cl.
CPC .............. *G01B 11/16* (2013.01); *G01L 1/24* (2013.01); *G06F 1/1626* (2013.01);
(Continued)

(58) Field of Classification Search
CPC ..... G01B 11/16; G06F 1/1656; G06F 1/1684; G06F 1/1626; G06F 1/1652; G08B 21/187; G01L 1/24
(Continued)

(56) References Cited

U.S. PATENT DOCUMENTS 6,212,306 B1   4/2001   Cooper et al.
9,772,180 B2   9/2017   Krimon et al.
(Continued)

FOREIGN PATENT DOCUMENTS

CN   101295219   10/2008
CN   103136490   6/2013
(Continued)

OTHER PUBLICATIONS

Japanese Patent Office, "Notice of Reason for Refusal," issued in connection with Japanese Application No. 2017-528209, dated Feb. 27, 2020, 5 pages. (English translation provided).
(Continued)

*Primary Examiner* — Don N Vo
(74) *Attorney, Agent, or Firm* — Hanley, Flight & Zimmerman, LLC

(57) ABSTRACT

Systems and methods may provide for determining an amount of physical bend in an electronic device and comparing the amount of physical bend to a threshold. Additionally, a warning may be generated if the amount of physical bend exceeds the threshold. In one example, one or more values representing the amount of physical bend are stored to a nonvolatile memory on the device and retrieved in accordance with one or more of a diagnostic push event or a diagnostic pull event.

20 Claims, 3 Drawing Sheets

Related U.S. Application Data continuation of application No. 15/715,794, filed on Sep. 26, 2017, now Pat. No. 10,371,505, which is a continuation of application No. 14/583,272, filed on Dec. 26, 2014, now Pat. No. 9,772,180.

(51) Int. Cl.
  *G06F 1/16* (2006.01)
  *G01L 1/24* (2006.01)
  *G08B 21/18* (2006.01)

(52) U.S. Cl.
  CPC .......... *G06F 1/1652* (2013.01); *G06F 1/1656* (2013.01); *G06F 1/1684* (2013.01); *G08B 21/187* (2013.01)

(58) Field of Classification Search
  USPC .......................................................... 340/679
  See application file for complete search history.

(56) References Cited

U.S. PATENT DOCUMENTS

| | | | |
|---|---|---|---|
| 10,088,927 | B2 | 10/2018 | Rothkopf et al. |
| 10,371,505 | B2 | 8/2019 | Krimon et al. |
| 10,921,116 | B2 * | 2/2021 | Krimon .................. G06F 1/1684 |
| 2010/0167791 | A1 * | 7/2010 | Lim .................... H04M 1/0266 |
| | | | 455/566 |
| 2013/0127606 | A1 | 5/2013 | Chang |
| 2013/0127767 | A1 | 5/2013 | Sorvisto et al. |
| 2013/0215088 | A1 | 8/2013 | Son et al. |
| 2013/0293455 | A1 | 11/2013 | Yang et al. |
| 2014/0049463 | A1 | 2/2014 | Seo et al. |
| 2014/0125578 | A1 * | 5/2014 | Zhou ........................ G09G 3/20 |
| | | | 345/156 |
| 2014/0132506 | A1 | 5/2014 | Cho et al. |
| 2014/0198036 | A1 * | 7/2014 | Kim ...................... G06F 3/0487 |
| | | | 345/156 |
| 2014/0362020 | A1 | 12/2014 | Rothkopf et al. |
| 2015/0009129 | A1 | 1/2015 | Song et al. |
| 2015/0138103 | A1 * | 5/2015 | Nishi .................. G02F 1/13452 |
| | | | 345/173 |

FOREIGN PATENT DOCUMENTS

| | | |
|---|---|---|
| CN | 103383951 | 11/2013 |
| CN | 103401974 | 11/2013 |
| CN | 103782150 | 5/2014 |
| EP | 2597635 | 5/2013 |
| JP | 2014006892 | 1/2014 |
| WO | 2012004629 | 1/2012 |

OTHER PUBLICATIONS

China National Intellectual Property Administration, "Notice of Grant of Patent Right for Invention," issued in connection with application No. 201580066274.3, dated May 12, 2020, 4 pages.
European Patent Office, "Communication Pursuant to Article 94(3) EPC," issued in connection with application No. 15874277.5, dated Jul. 2, 2020, 6 pages.
FlatFrog, "How FlatFrog Touch works", retrieved on Nov. 26, 2014, 1 page, FlatFrog.
Lovering, "Flexible, Printed Batteries for Wearable Devices", TechnologyReview.com, Jul. 18, 2014, 2 pages, MIT Technology Review, <http:/fwww.technologyreview.com/news/528996/flexible-printed-batterie- - s-for-wearable-devices/>.
Jay McGregor, "LG Unveils Display That Can Be Rolled Up Like a Piece of Paper", Forbes, Jul. 11, 2014, 4 pages, Forbes.com, <http:/fonforb.es/IWYqzz>.
Mat Smith, "Nokia's Kinetic Future: Flexible Screens and a Twisted Interface (video)", engadget.com, Oct. 26, 2011, 11 pages. Engadget. com. <http://www.engadget.com/2011/10/26/nokiaskineticfutureflexiblescreens- - andatwistedinterface/. (Document available in Parent U.S. Appl. No. 14/583,272.).
United States Patent and Trademark Office, "Non-Final Office Action," issued in connection with U.S. Appl. No. 14/583,272, dated Feb. 17, 2016, 10 pages.
United States Patent and Trademark Office, "Final Office Action," issued in connection with U.S. Appl. No. 14/583,272, dated Aug. 10, 2016, 8 pages.
United States Patent and Trademark Office, "Non-Final Office Action," issued in connection with U.S. Appl. No. 14/583,272, dated Jan. 6, 2017, 9 pages.
United States Patent and Trademark Office, "Notice of Allowance and Fee(s) Due," issued in connection with U.S. Appl. No. 14/583,272, dated May 31, 2017, 5 pages.
International Searching Authority, "International Preliminary Report on Patentability," issued in connection with application No. PCT/US2015/067265, dated Jun. 27, 2017, 12 pages.
International Searching Authority, "International Search Report," issued in connection with application No. PCT/US2015/067265, dated Apr. 6, 2016, 3 pages.
International Searching Authority, "Written Opinion," issued in connection with application No. PCT/US2015/067265, dated Apr. 6, 2016, 11 pages.
European Patent Office, "Extended European Search Report," issued in connection with European Application No. 15874277.5, dated Jun. 27, 2018, 16 pages.
United States Patent and Trademark Office, "Final Office Action," issued in connection with U.S. Appl. No. 15/715,794, dated Jul. 20, 2018, 9 pages.
United States Patent and Trademark Office, "Non-Final Office Action," issued in connection with U.S. Appl. No. 15/715,794, dated Mar. 28, 2018, 7 pages.
United States Patent and Trademark Office, "Notice of Allowance and Fee(s) Due," issued in connection with U.S. Appl. No. 15/715,794, dated Mar. 20, 2019, 5 pages.
China National Intellectual Property Administration, "First Office Action," issued in connection with application No. 201580066274.3, dated Apr. 24, 2019, 12 pages.
China National Intellectual Property Administration, "Second Office Action," issued in connection with application No. 201580066274.3, dated Dec. 18, 2019, 18 pages. (English translation provided).
Japanese Patent Office, "Notice of Reasons for Refusal," issued in connection with application No. 2017-528209, dated Sep. 13, 2019, 8 pages. (English translation provided).
Japanese Patent Office, "Notice of Reasons for Refusal," issued in connection with application No. 2017-528209, dated Sep. 15, 2020, 12 pages. (English translation provided).
United States Patent and Trademark Office, "Non-Final Office Action," issued in connection with U.S. Appl. No. 16/532,392, dated Feb. 27, 2020, 7 pages.
United States Patent and Trademark Office, "Notice of Allowance and Fee(s) Due," issued in connection with U.S. Appl. No. 16/532,392, dated Oct. 14, 2020, 7 pages.
United States Patent and Trademark Office, "Corrected Notice of Allowability," issued in connection with U.S. Appl. No. 16/532,392, dated Dec. 10, 2020, 2 pages.
China National Intellectual Property Administration, "First Office Action," issued in connection with application No. 202010598207.9, dated Jul. 5, 2021, 12 pages.
China National Intellectual Property Administration, "Second Office Action," issued in connection with application No. 202010598207.9, dated Mar. 16, 2022, 10 pages.
European Patent Office, "Summons to attend oral proceedings pursuant to Rule 115(1) EPC," issued in connection with application No. 15874277.5, dated Jun. 15, 2021, 8 pages.
European Patent Office, "Decision to refuse a European Patent application," issued in connection with application No. 15874277.5, dated Dec. 16, 2021, 12 pages.
Taiwan Patent Office, "Search Report," issued in connection with application No. 104139140, dated Oct. 19, 2016, 6 pages.
European Patent Office, "Result of consultation," issued in connection with application No. 15874277.5, dated Dec. 7, 2021, 7 pages.

(56) References Cited

OTHER PUBLICATIONS

Korean Patent Office, "Office Action." issued in connection with Korean Application No. 2017-7014180, dated Jun. 24, 2022, 9 pages.

* cited by examiner

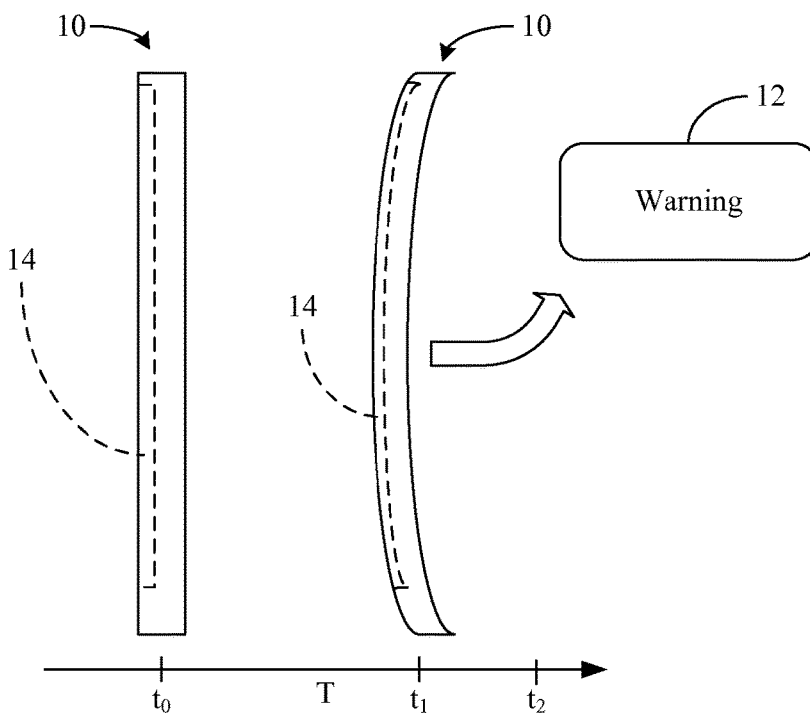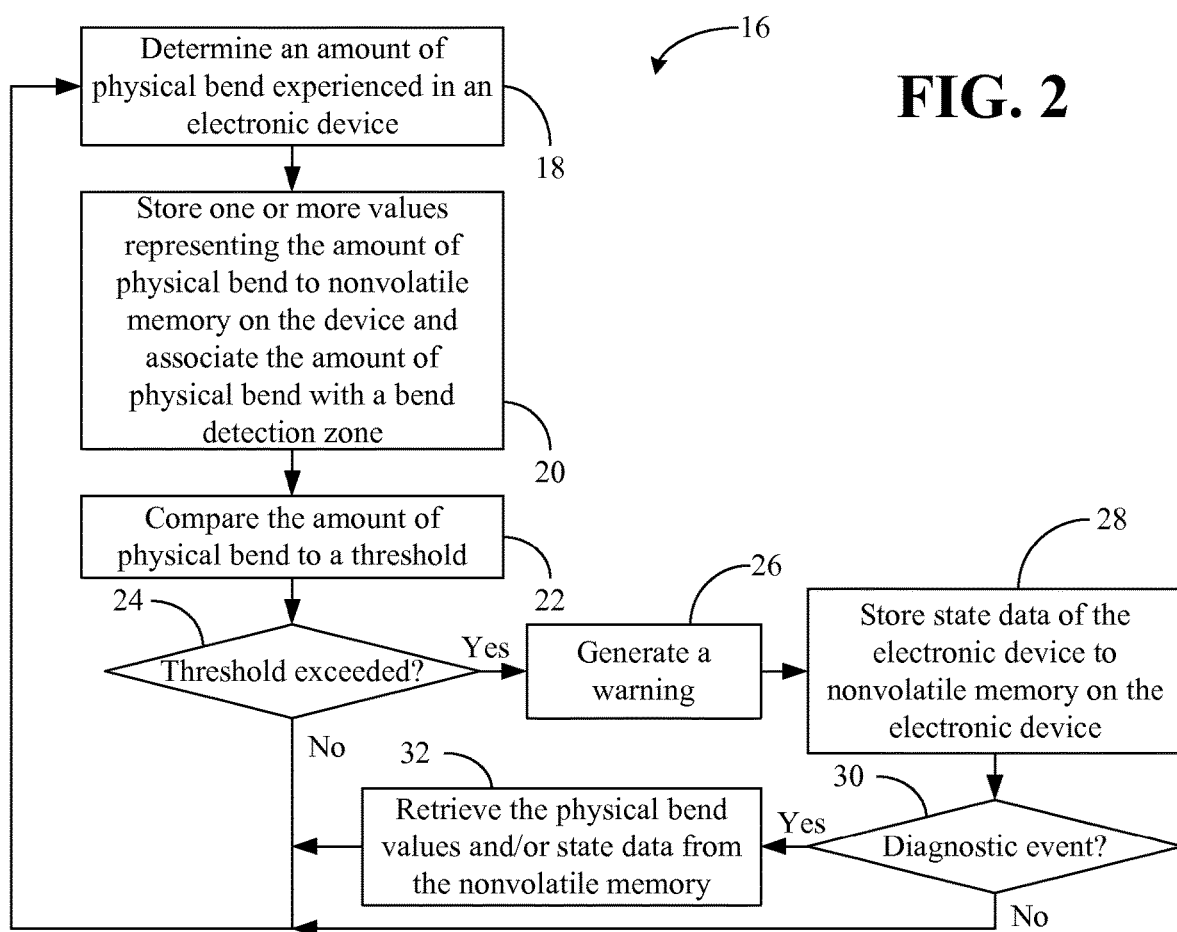

FIG. 3A
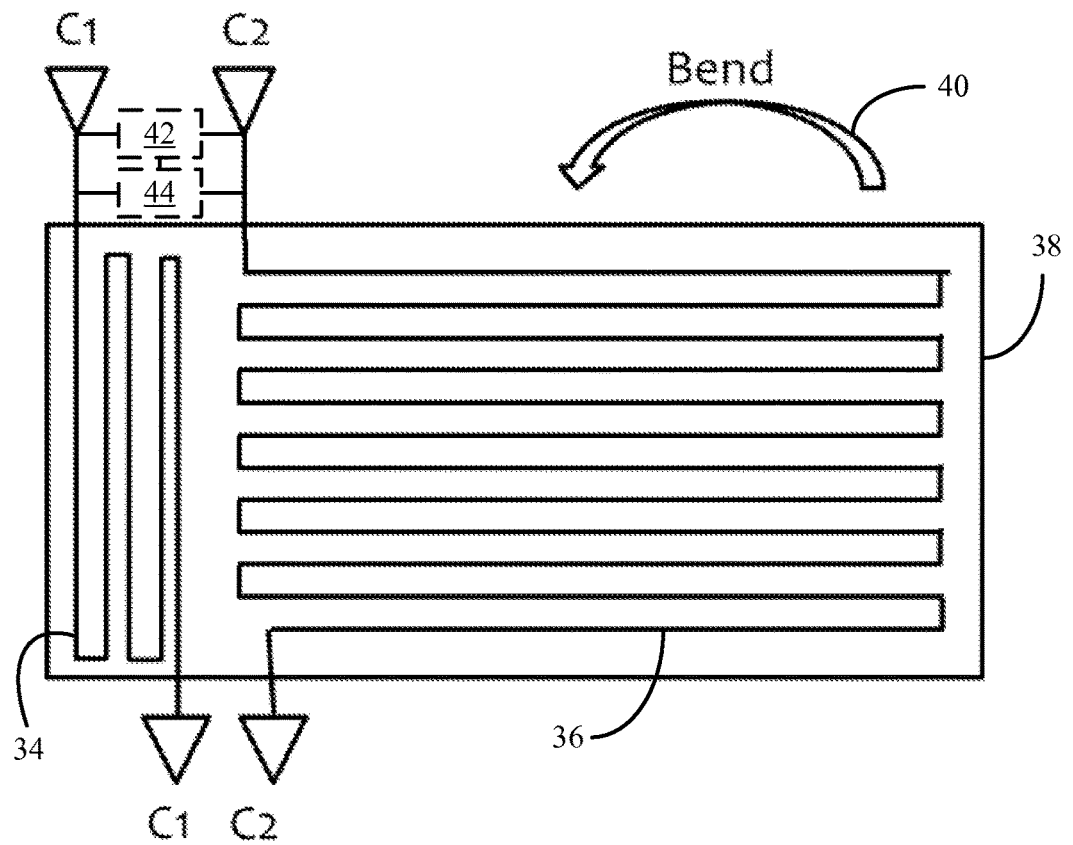
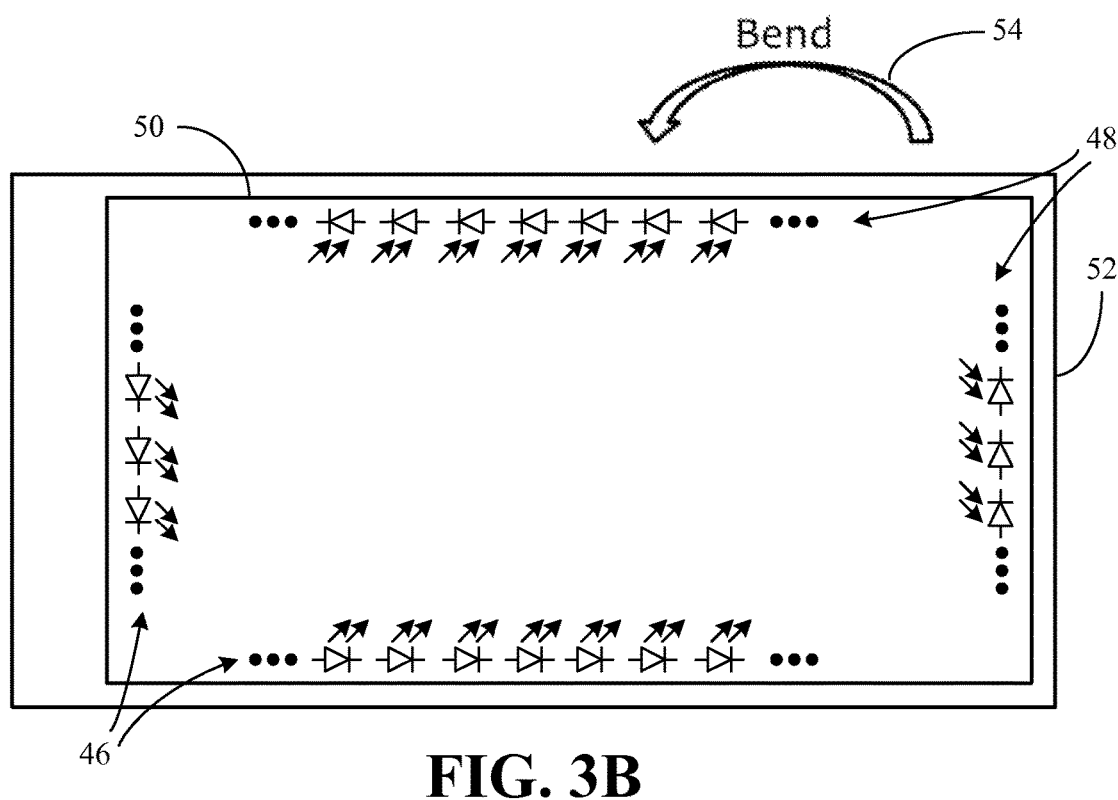
FIG. 3B

DETERMINING DEVICE CURVATURE IN SMART BENDABLE SYSTEMS

RELATED APPLICATIONS

This patent arises from a continuation of U.S. patent application Ser. No. 16/532,392, filed Aug. 5, 2019, which is a continuation of U.S. patent application Ser. No. 15/715, 794, filed Sep. 26, 2017, now U.S. Pat. No. 10,371,505, which is a continuation of U.S. patent application Ser. No. 14/583,272, filed Dec. 26, 2014, now U.S. Pat. No. 9,772, 180. U.S. patent application Ser. No. 16/532,392, U.S. patent application Ser. No. 15/715,794 and U.S. patent application Ser. No. 14/583,272 are hereby incorporated by reference herein in their entireties.

TECHNICAL FIELD

Embodiments generally relate to bendable electronic devices. More particularly, embodiments relate to determining device curvature in bendable systems.

BACKGROUND

Electronic devices such as, for example, smart phones and tablet computers may be carried and/or manipulated in a manner that causes the devices to physically bend (e.g., either deliberately or non-deliberately). If the bending is excessive, damage may occur to the device, wherein the source of the damage may be difficult to determine in diagnostic settings such as warranty claim processing environments. While mechanical stops and/or reinforcements may be incorporated into the device in order to limit bending, such a solution may substantially increase the overall cost and/or weight of the device.

BRIEF DESCRIPTION OF THE DRAWINGS

The various advantages of the embodiments will become apparent to one skilled in the art by reading the following specification and appended claims, and by referencing the following drawings, in which:

FIG. 1 is an illustration of an example of a bend-related warning according to an embodiment;

FIG. 2 is a flowchart of an example of a method of managing physical bend in an electronic device according to an embodiment;

FIG. 3A is a plan view of an example of an electrical measurement layout according to an embodiment;

FIG. 3B is a plan view of an example of an optical measurement layout according to an embodiment;

DESCRIPTION OF EMBODIMENTS

Figures 4, 5:
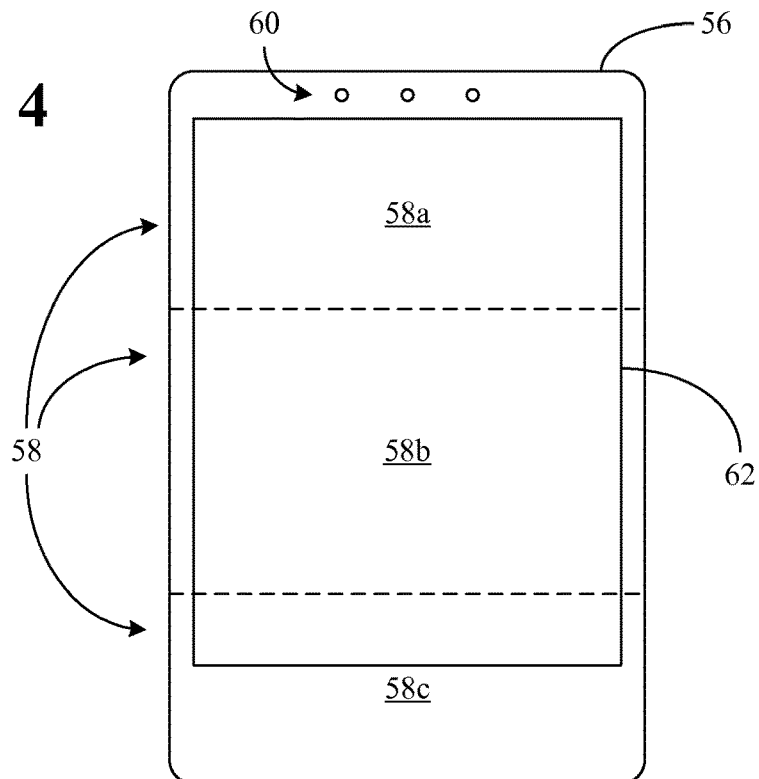
FIG. 4 is a rotated plan view of an example of an electronic device having a plurality of bend detection zones according to an embodiment.
FIG. 5 is an illustration of an example of an electronic device according to an embodiment.

Turning now to FIG. 1, a device 10 is shown, wherein the device 10 may include, for example, a tablet computer, smart phone, personal digital assistant (PDA), mobile Internet device (MID), wearable computer, media player, etc., or any other bendable device. At an illustrated time to, the device 10 is in a substantially flat (e.g., unbent) state and at time $t_1$ the device 10 may be bent into a curved state (e.g., intentionally or unintentionally). In the illustrated example, a warning 12 is automatically generated by the device 10 if the amount of physical bend (e.g., curvature) experienced by the device 10 gives rise to a risk of damaging a display 14 or other component (e.g., circuit board, processor, chipset, controller, memory device, battery, etc.) of the device 10. As will be discussed in greater detail, the warning 12 may include, for example, an audio output (e.g., audible alarm), a visual output (e.g., graphical notification), a vibratory output (e.g., haptic notification), a remote message (e.g., text message, email), etc., configured to notify a user of the device 10 and/or other entity (e.g., manufacturer, warranty processor) of the curved state. Accordingly, the device 10 may substantially reduce the likelihood of damage to itself by self-monitoring curvature.

FIG. 2 shows a method 16 of managing physical bend in an electronic device. The method 16 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 16 may be written in any combination of one or more programming languages, including an object oriented programming language such as JAVA, SMALLTALK, C++ or the like and conventional procedural programming languages, such as the "C" programming language or similar programming languages.

Illustrated processing block 18 provides for determining an amount of physical bend experienced in the electronic device. As will be discussed in greater detail, block 18 may include measuring a pulse length variation in an electrical signal transmitted in the electronic device, measuring a resonance frequency of the electronic device, measuring a time of flight of an optical signal transmitted in the electronic device, etc., or any combination thereof, to determine the amount of physical bend. Block 20 may optionally store one or more values representing the amount of physical bend to nonvolatile memory (NVM) on the device. The values may also be transmitted off of the device, depending on the circumstances. Documenting the physical bend may facilitate more efficient execution of subsequent diagnostic activities such as, for example, warranty claim processing and/or repair of the device.

Block 20 may also optionally provide for associating the amount of physical bend with a particular bend detection zone, wherein the device may have a plurality of bend detection zones, as discussed in greater detail below. In addition to bend event information, block 20 may determine and store additional information including, but not limited to, time and date of the event, device information, device status while the event occurred, geo location and/or other sensor readings such as, for example, accelerometer, temperature, pressure, etc. In addition, access to the information, either locally stored or transmitted by push/pull events, may require authentication and/or may be protected by cryptographic technology such as encryption and/or digital signatures.

Block 22 may provide for comparing the amount of physical bend to a threshold, wherein the threshold may be, for example, an absolute threshold (e.g., bend angle), a rate of change threshold (e.g., rate of change in bend angle), etc., or any combination thereof. Additionally, the threshold may be a series of thresholds (e.g., multi-staged threshold) such as, for example, a first threshold of 2°, a second threshold of 10°, and so forth. Moreover, the threshold or series of thresholds may be specific to a particular bend detection zone in instances where a plurality of bend detection zones are used. In addition, if it is determined that the bend angle or rate of change in the bend angle is increasing, the sampling rate of the bend measurement may be correspondingly increased to further protect the device.

A determination may be made at block 24 as to whether at least one threshold has been exceeded by the amount of physical bend (e.g., current bend angle is 3° and the threshold is 2°). If so, illustrated block 26 generates a warning such as, for example, an audio output (e.g., audible alarm), a visual output (e.g., graphical notification), a vibratory output (e.g., haptic notification), a remote message (e.g., text message, email), etc., or any combination thereof. Moreover, the type of warning and/or intensity may be dependent on the stage that has been reached in a multi-staged threshold solution. For example, earlier stages might involve a single mode of warning and/or a relatively low intensity, whereas subsequent stages may involve multiple modes of warnings and/or greater intensity. Additionally, the type of warning may be specific to a particular bend detection zone in instances where a plurality of bend detection zones are used.

In one optional example, illustrated block 28 stores state data of the electronic device such as, for example, hardware/register state data, software/application state data, time/date data, device information, sensor readings, etc., to NVM on the electronic device. The state data may also be transmitted off of the device and/or protected by cryptographic technology, depending on the circumstances. The selection of the state data to be stored as well as the selection of the NVM to which the state data is stored may be based on the bend detection zone involved. For example, data stored in a register physically located in a bend detection zone having an exceeded threshold may be copied to an NVM that is physically located outside that bend detection zone in order to increase the likelihood of recovery of the state data subsequent to the bend event. Block 28 may also involve conducting other activities to facilitate data recovery such as, for example, triggering closure of open user files, acquiescing storage firmware to a safe mode, and so forth.

A determination may optionally be made at block 30 as to whether a diagnostic event such as, for example, a diagnostic push event (e.g., periodic report out of device status information), a diagnostic pull event (e.g., remote request for device status information), etc., has occurred. If so, the physical bend values and/or the state data may be retrieved from the NVM at block 32. After retrieving the physical bend values and/or state data, the illustrated method terminates. If it is determined at block 30 that a diagnostic event has not occurred, the method 16 may terminate without retrieving the physical bend values or the state data. Additionally, if it is determined at block 24 that at least one threshold has not been exceeded by the amount of physical bend, the illustrated method 16 terminates without generating a warning (although the non-critical bend values may still reside in NVM on the device).

Turning now to FIG. 3A, an electrical measurement layout is shown in which a first electrical conductor 34 is routed (e.g., looped) through a first region of an electronic device 38 (e.g., providing an electrical path C1-C1) and a second electrical conductor 36 is routed through a second region of the electronic device 38 (e.g., providing an electrical path C2-C2 that is longitudinally perpendicular to the electrical path C1-C1). The electrical conductors 34, 36 may be embedded in, for example, a display, chassis, housing or other suitable component of the electronic device 38. In operation, an electrical signal may be transmitted/pulsed through each of the electrical conductors 34, 36, wherein a physical bend 40 (e.g., torsion) of the electronic device 38 in, for example, the second region may lengthen the flight time of the electrical signal in the second electrical conductor 36 (e.g., increasing the pulse length). The variation/change in pulse length may be detected and compared with the flight time of the electrical signal transmitted/pulsed through the first electrical conductor 34, which is not subjected to the physical bend 40, to obtain a temperature invariant solution to measuring the amount of physical bend experienced in the electronic device 38. Such an approach may effectively provide for self-calibration of the analog circuits supporting the bend measurements.

In another example, one or more capacitive elements 42 (e.g., of arbitrary capacitance) may be connected to the electrical conductors 34, 36 in such a way that creates either a parallel or a serial resonance circuit. Additionally, a detector circuit 44 may inject electrical signals into the capacitive elements 42 and/or the electrical conductors 34, 36, and measure the resonance frequencies of the electronic device 38. The measured resonance frequencies may be in turn analyzed to determine the amount of physical bend experienced in the electronic device 38.

The detector circuit 44 may also measure the capacitance of the one or more capacitive elements 42, which may be influenced by bending-related mechanical stresses. Additionally, the one or more capacitive elements 42 may be replaced or supplemented with one or more inductive elements (not shown). In yet another example, the amplitude of the resonance circuit measurements may be monitored, wherein any change in the geometry of the capacitive/inductive elements may result in a change in the expected degradation of the amplitude.

FIG. 3B shows an optical measurement layout in which optical transmitters 46 (e.g., light emitting diodes/LEDs) and optical receivers 48 (e.g., photo-detectors) are positioned around a periphery of a display 50 embedded in an electronic device 52. Since the display 50 may function as a waveguide, as the display 50 experiences a physical bend 54, the time of flight of the optical signals transmitted by the optical transmitters 46 may change. The time of flight, as well as other attributes such as beam spread, may be correlated with bend angle. Other physical properties and/or attributes may also be monitored in order to detect the amount of bend experienced by the electronic device 52 and/or the electronic device 38 (FIG. 3A).

Turning now to FIG. 4, an example of an electronic device 56 having a plurality of bend detection zones 58 (58a-58c) is shown. As already noted, the amount of physical bend experienced by the electronic device 56 may be determined on a per-zone basis. Accordingly, each zone 58 might include a plurality of electrical conductors such as, for example, the electrical conductors 34, 36 (FIG. 3A) to determine pulse length variation. Moreover, threshold determinations may also be determined on a per-zone basis, wherein each zone 58 may have one or more zone-specific bend thresholds. For example, a first zone 58a may have a series of thresholds selected to primarily protect components 60 (e.g., camera, microphone, ambient light sensor) near the top of the electronic device 56, a second zone 58b may have one or more thresholds selected to primarily protect a display 62, a third zone 58c might have a single threshold selected to protect components near the bottom of the electronic device 56, and so forth.

FIG. 5 shows a computing device 64. The computing device 64 may be part of an electronic device/platform having computing functionality (e.g., PDA, notebook computer, tablet computer), communications functionality (e.g., wireless smart phone), imaging functionality, media playing functionality (e.g., smart television/TV), wearable functionality (e.g., watch, eyewear, headwear, footwear, jewelry) or any combination thereof (e.g., MID). In the illustrated example, the device 64 includes a bendable chassis 86, a battery 66 to supply power to the device 64 and a processor 68 having an integrated memory controller (IMC) 70, which may communicate with system memory 72. The device 64 may alternatively be powered by another type of power source such as, for example, induction power, a fuel cell or alternating current (AC) power. The system memory 72 may include, for example, dynamic random access memory (DRAM) configured as one or more memory modules such as, for example, dual inline memory modules (DIMMs), small outline DIMMs (SODIMMs), etc.

The illustrated device 64 also includes an input output (IO) module 74 implemented together with the processor 68 on a semiconductor die 65 as a system on chip (SoC), wherein the IO module 74 functions as a host device and may communicate with, for example, a bendable display 76 (e.g., touch screen, liquid crystal display/LCD, light emitting diode/LED display), a network controller 78, mass storage 80 (e.g., hard disk drive/HDD, optical disk, flash memory, etc.), and a bend measurement circuit 82. The bend measurement circuit 82 may include looped electrical conductors such as, for example, the electrical conductors 34, 36 (FIG. 3A), detector circuits such as, for example, the detector circuit 44 (FIG. 3A), resonance circuits, optical transmitters and receivers, etc., to facilitate curvature measurements, as already discussed. The illustrated processor 68 may execute logic 84 that uses the bend measurement circuit 82 to determine an amount of physical bend experienced in the computing device 64, compare the amount of physical bend to a threshold, and generate a warning if the amount of physical bend exceeds the threshold. Generating the warning may involve triggering, for example, an audio output from one or more speakers 67, a visual output from the bendable display 76 and/or one or more LEDs 69, a vibratory output from a vibration device 71, a remote message from the network controller 78, and so forth. Thus, the logic 84 may perform one or more aspects of the method 16 (FIG. 2), already discussed.

Additional Notes and Examples

Example 1 may include an electronic device comprising a bendable chassis, a bendable display, and logic, implemented at least partly in fixed-functionality hardware, to determine an amount of physical bend experienced in one or more of the bendable chassis or the bendable display, compare the amount of physical bend to a threshold, and generate a warning if the amount of physical bend exceeds the threshold.

Example 2 may include the electronic device of Example 1, further including a nonvolatile memory, wherein the logic is to store one or more values representing the amount of physical bend to the nonvolatile memory; and retrieve the one or more values from the nonvolatile memory in accordance with one or more of a diagnostic push event or a diagnostic pull event.

Example 3 may include the electronic device of Example 1, further including a nonvolatile memory, wherein the logic is to store state data of the electronic device to a nonvolatile memory on the electronic device if the amount of physical bend exceeds the threshold.

Example 4 may include the electronic device of any one of Examples 1 to 3, wherein the threshold is to be one or more of an absolute threshold or a rate of change threshold.

Example 5 may include the electronic device of any one of Examples 1 to 3, further including a plurality of bend detection zones, wherein the logic is to associate the amount of physical bend with one of the plurality of bend detection zones.

Example 6 may include the electronic device of any one of Examples 1 to 3, wherein the logic is to measure one or more of a pulse length variation in an electrical signal transmitted in the electronic device, a resonance frequency of the electronic device or a time of flight of an optical signal transmitted in the electronic device to determine the amount of physical bend.

Example 7 may include an apparatus to manage physical bend, comprising logic, implemented at least partly in fixed-functionality hardware, to determine an amount of physical bend experienced in an electronic device, compare the amount of physical bend to a threshold, and generate a warning if the physical bend exceeds the threshold.

Example 8 may include the apparatus of Example 7, wherein the logic is to store one or more values representing the amount of physical bend to a nonvolatile memory on the device; and retrieve the one or more values from the nonvolatile memory in accordance with one or more of a diagnostic push event or a diagnostic pull event.

Example 9 may include the apparatus of Example 7, wherein the logic is to store state data of the electronic device to a nonvolatile memory on the electronic device if the amount of physical bend exceeds the threshold.

Example 10 may include the apparatus of any one of Examples 7 to 9, wherein the threshold is to be one or more of an absolute threshold or a rate of change threshold.

Example 11 may include the apparatus of any one of Examples 7 to 9, wherein the electronic device is to have a plurality of bend detection zones and the logic is to associate the amount of physical bend with one of the plurality of bend detection zones.

Example 12 may include the apparatus of any one of Examples 7 to 9, wherein the logic is to measure one or more of a pulse length variation in an electrical signal transmitted in the electronic device, a resonance frequency of the electronic device or a time of flight of an optical signal transmitted in the electronic device to determine the amount of physical bend.

Example 13 may be apparatus of any one of Examples 7 to 9, wherein the logic is to trigger one or more of an audio output, a visual output, a vibratory output or a remote message to generate the warning.

Example 14 may include a method of managing physical bend, comprising determining an amount of physical bend experienced in an electronic device, comparing the amount of physical bend to a threshold, and generating a warning if the physical bend exceeds the threshold.

Example 15 method may include the method of Example 14, further including storing one or more values representing the amount of physical bend to a nonvolatile memory on the device; and retrieving the one or more values from the nonvolatile memory in accordance with one or more of a diagnostic push event or a diagnostic pull event.

Example 16 may include the method of Example 14, further including storing state data of the electronic device to a nonvolatile memory on the electronic device if the amount of physical bend exceeds the threshold.

Example 17 may include the method of any one of Examples 14 to 16, wherein the threshold is one or more of an absolute threshold or a rate of change threshold.

Example 18 may include at least one computer readable storage medium comprising a set of instructions which, when executed by an electronic device, cause the electronic device to determine an amount of physical bend experienced in the electronic device, compare the amount of physical bend to a threshold, and generate a warning if the amount of physical bend exceeds the threshold.

Example 19 may include the at least one non-volatile computer readable storage medium of Example 18, wherein the instructions, when executed, cause the electronic device to store one or more values representing the amount of physical bend to a nonvolatile memory on the device; and retrieve the one or more values from the nonvolatile memory in accordance with one or more of a diagnostic push event or a diagnostic pull event.

Example 20 may include the at least one non-volatile computer readable storage medium of Example 18, wherein the instructions, when executed, cause the electronic device to store state data of the electronic device to a nonvolatile memory on the electronic device if the amount of physical bend exceeds the threshold.

Example 21 may include the at least one non-volatile computer readable storage medium of any one of Examples 18 to 20, wherein the threshold is to be one or more of an absolute threshold or a rate of change threshold.

Example 22 may include the at least one non-volatile computer readable storage medium of any one of Examples 18 to 20, wherein the electronic device is to have a plurality of bend detection zones and the instructions, when executed, cause the device to associate the amount of physical bend with one of the plurality of bend detection zones.

Example 23 may include the at least one non-volatile computer readable storage medium of any one of Examples 18 to 20, wherein the instructions, when executed, cause the electronic device to measure one or more of a pulse length variation in an electrical signal transmitted in the electronic device, a resonance frequency of the electronic device or a time of flight of an optical signal transmitted in the electronic device to determine the amount of physical bend.

Example 24 may include the at least one non-volatile computer readable storage medium of any one of Examples 18 to 20, wherein the instructions, when executed, cause the electronic device to trigger one or more of an audio output, a visual output, a vibratory output or a remote message to generate the warning.

Example 25 may include a bend damage protection apparatus comprising means for determining an amount of physical bend experienced in an electronic device; means for comparing the amount of physical bend to a threshold; and means for generating a warning if the amount of physical bend exceeds the threshold.

Example 26 may include the apparatus of Example 25, further including means for storing one or more values representing the amount of physical bend to a nonvolatile memory on the device; and means for retrieving the one or more values from the nonvolatile memory in accordance with one or more of a diagnostic push event or a diagnostic pull event.

Example 27 may include the apparatus of Example 25, further including means for storing state data of the electronic device to a nonvolatile memory on the electronic device if the amount of physical bend exceeds the threshold.

Example 28 may include the apparatus of any one of Examples 25 to 27, wherein the threshold is to be one of an absolute threshold or a rate of change threshold.

Thus, techniques described herein may enable smart bendable systems/devices to automatically notify users when the amount of bend has reached or is nearing an excessive limit. Accordingly, users may have greater assurance that their devices will not be damaged while, for example, being carried in a back pocket, and manufacturers may be able to offer a wider array of design choices without concern over growing warranty claims.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

The invention claimed is:

1. An electronic device comprising:
   a bendable display; and
   logic circuitry, implemented at least partly in fixed-functionality hardware, to:
      determine at least one of a change in a duration of time for a signal to transmit through the bendable display or a change in a resonance frequency of an electrical signal injected into the bendable display;
      determine an amount of bending of the bendable display based on the at least one of the change in a duration or the change in the resonance frequency;
      compare the amount of bending to a threshold; and
      in response to the bending exceeding the threshold, store an indication of the bending.

2. The electronic device of claim 1, further including a nonvolatile memory, wherein the logic circuitry is to:
   store a value representing the bending to the nonvolatile memory; and
   retrieve the value from the nonvolatile memory in accordance with at least one of a diagnostic push event or a diagnostic pull event.

3. The electronic device of claim 1, further including a nonvolatile memory, wherein the logic circuitry is to store state data of the electronic device to the nonvolatile memory when the amount of bending exceeds the threshold.

4. The electronic device of claim 1, wherein the threshold is at least one of an absolute threshold or a rate of change threshold.

5. The electronic device of claim 1, wherein the time is a pulse length of the electrical signal transmitted in the electronic device.

6. The electronic device of claim 1, wherein the electrical signal is transmitted in a conductor attached to the bendable display.

7. The electronic device of claim 1, wherein the time is a time of flight of an optical signal transmitted in the electronic device.

8. A method comprising:
   determining at least one of a change in a duration of time for a signal to transmit through a bendable display or a change in a resonance frequency of an electrical signal injected into the bendable display of an electronic device;
   determining an amount of bending of the bendable display based on the at least one of the change in a duration or the change in the resonance frequency;
   comparing the amount of bending to a threshold; and
   in response to the bending exceeding the threshold, store an indication of the bending.

9. The method of claim 8, further including:
   storing a value representing the bending to a nonvolatile memory; and
   retrieving the value from the nonvolatile memory in accordance with at least one of a diagnostic push event or a diagnostic pull event.

10. The method of claim 8, further including storing state data of the electronic device to a nonvolatile memory when the amount of bending exceeds the threshold.

11. The method of claim 8, wherein the threshold is at least one of an absolute threshold or a rate of change threshold.

12. The method of claim 8, wherein the time is a pulse length of the electrical signal transmitted in the electronic device.

13. The method of claim 8, wherein the electrical signal is transmitted in a conductor attached to the bendable display.

14. The method of claim 8, wherein the time is a time of flight of an optical signal transmitted in the electronic device.

15. A hardware computer readable medium comprising instructions that, when executed, cause an electronic device to at least:
   determine at least one of a change in a duration of time for a signal to transmit through a bendable display or a change in a resonance frequency of an electrical signal injected into the bendable display of the electronic device;
   determine an amount of bending of the bendable display based on the at least one of the change in a duration or the change in the resonance frequency;
   compare the amount of bending to a threshold; and
   in response to the bending exceeding the threshold, store an indication of the bending.

16. The hardware computer readable medium of claim 15, wherein the instructions, when executed, cause the electronic device to:
   store a value representing the bending to a nonvolatile memory; and
   retrieve the value from the nonvolatile memory in accordance with at least one of a diagnostic push event or a diagnostic pull event.

17. The hardware computer readable medium of claim 15, wherein the instructions, when executed, cause the electronic device to store state data of the electronic device to a nonvolatile memory when the amount of bending exceeds the threshold.

18. The hardware computer readable medium of claim 15, wherein the threshold is at least one of an absolute threshold or a rate of change threshold.

19. The hardware computer readable medium of claim 15, wherein the time is a pulse length of the electrical signal transmitted in the electronic device.

20. The hardware computer readable medium of claim 15, wherein the electrical signal is transmitted in a conductor attached to the bendable display.

* * * * *